US010634236B2

(12) United States Patent
Morimoto et al.

(10) Patent No.: US 10,634,236 B2
(45) Date of Patent: Apr. 28, 2020

(54) HYDRAULIC SUPPLY STRUCTURE

(71) Applicant: Honda Motor Co., Ltd., Tokyo (JP)

(72) Inventors: Yasuhiro Morimoto, Saitama (JP); Natsumi Iizuka, Saitama (JP); Ryusuke Kagaya, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 279 days.

(21) Appl. No.: 15/916,292

(22) Filed: Mar. 9, 2018

(65) Prior Publication Data

US 2018/0283530 A1   Oct. 4, 2018

(30) Foreign Application Priority Data

Mar. 29, 2017   (JP) .................................. 2017-066257

(51) Int. Cl.
*F16H 57/04*    (2010.01)

(52) U.S. Cl.
CPC ....... *F16H 57/0456* (2013.01); *F16H 57/043* (2013.01); *F16H 57/0434* (2013.01); *F16H 57/0473* (2013.01)

(58) Field of Classification Search
CPC ............... F16H 57/0456; F16H 57/043; F16H 57/0434; F16H 57/0473
See application file for complete search history.

(56) References Cited

U.S. PATENT DOCUMENTS

| | | | | |
|---|---|---|---|---|
| 3,785,458 A | * | 1/1974 | Caldwell | B60R 17/00 184/6.12 |
| 4,480,493 A | * | 11/1984 | Takahashi | F16H 7/0494 184/6.12 |
| 4,987,974 A | * | 1/1991 | Crouch | F16H 57/043 184/11.1 |
| 5,154,517 A | * | 10/1992 | Hodge | F16C 33/4623 384/470 |
| 7,022,039 B2 | * | 4/2006 | Hasegawa | F16H 57/043 475/159 |
| 7,322,900 B2 | * | 1/2008 | Ichioka | B60K 6/405 184/6.12 |
| 8,905,192 B2 | * | 12/2014 | Araki | F16H 57/0426 184/6.12 |

(Continued)

FOREIGN PATENT DOCUMENTS

| | | |
|---|---|---|
| CN | 1789773 | 6/2006 |
| CN | 102431535 | 5/2012 |

(Continued)

OTHER PUBLICATIONS

"Office Action of China Counterpart Application," dated Jul. 10, 2019, with English translation thereof, p. 1-p. 9.

*Primary Examiner* — Michael A Riegelman
(74) *Attorney, Agent, or Firm* — JCIPRNET (57) ABSTRACT

Provided is a hydraulic supply structure. The hydraulic supply structure includes an inner pipe configured to form a first pipe path which is a part of a first hydraulic supply passage, an outer pipe configured to form a second pipe path which is a part of a second hydraulic supply passage between the inner pipe and the outer pipe, and an annular inner pipe holding portion and an annular outer pipe holding portion configured to fix the inner pipe and the outer pipe to a casing. Each of the outer pipe holding portion and the inner pipe holding portion is a part of a pipe holding member configured as an integral member.

7 Claims, 5 Drawing Sheets

(56) References Cited

U.S. PATENT DOCUMENTS

| | | | |
|---|---|---|---|
| 2013/0092273 A1* | 4/2013 | Haupt | F15B 1/04 |
| | | | 138/30 |
| 2018/0283530 A1* | 10/2018 | Morimoto | F16H 57/0456 |
| 2019/0284974 A1* | 9/2019 | Fukamizu | F16H 57/0426 |
| 2019/0285164 A1* | 9/2019 | Nomura | F16H 57/0424 |

FOREIGN PATENT DOCUMENTS

| | | |
|---|---|---|
| CN | 106032866 | 10/2016 |
| JP | 2013-170594 | 9/2013 |
| JP | 2016011728 | 1/2016 |

* cited by examiner

FIG. 5B

HYDRAULIC SUPPLY STRUCTURE

CROSS-REFERENCE TO RELATED APPLICATION

This application claims the priority of Japan patent application serial no. 2017-066257, filed on Mar. 29, 2017. The entirety of the above-mentioned patent application is hereby incorporated by reference herein and made a part of this specification.

BACKGROUND

Technical Field

The disclosure relates to a hydraulic supply structure in which a hydraulic pressure is supplied through a first hydraulic supply passage and a second hydraulic supply passage.

Description of Related Art

Conventionally, there is known a hydraulic supply structure incorporated in a transmission in which a first hydraulic pressure and a second hydraulic pressure which may be supplied to a rear side at different timings are supplied to a front side via a first hydraulic supply passage and a second hydraulic supply passage, respectively (for example, refer to Patent Document 1: Japanese Patent Application Laid-Open No. 2013-170594).

The hydraulic supply structure disclosed in Patent Document 1 includes an inner pipe which forms a part of the first hydraulic supply passage and has a first flange-like portion extending radially outward from an outer circumference of a rear side end portion thereof, and an outer pipe which forms a part of the second hydraulic supply passage between the outer pipe and the inner pipe and having a second flange-like portion extending radially outward from an outer circumference of a rear side end portion thereof. The outer pipe is disposed so that a rear side end portion thereof is located in front of the first flange-like portion of the inner pipe.

The inner pipe and the outer pipe are accommodated inside a casing of a transmission. The hydraulic supply structure further includes an annular inner pipe holding portion which is provided close to a front side of the first flange-like portion and is in contact with the outer circumference of the inner pipe and the first flange-like portion to hold the inner pipe in the casing, and an annular outer pipe holding portion which is in contact with the outer circumference of the outer pipe and the second flange-like portion and fixes the outer pipe to the casing.

The first hydraulic pressure is supplied into the inner pipe from a rear end portion of the inner pipe. The second hydraulic pressure is supplied to a space between the outer pipe and the inner pipe from an end portion of the outer pipe via a space between the inner pipe holding portion and the outer pipe holding portion.

However, according to the hydraulic supply structure of Patent Document 1, the outer pipe holding portion and the inner pipe holding portion are configured as separate members separate from each other. Therefore, when the first hydraulic pressure is supplied to the first hydraulic supply passage and the second hydraulic pressure is not supplied to the second hydraulic supply passage, the inner pipe holding portion is slightly displaced forward due to a pressure difference between the two supply passages. Further, conversely, when the first hydraulic pressure is not supplied to the first hydraulic supply passage and the second hydraulic pressure is supplied to the second hydraulic supply passage, the inner pipe holding portion is slightly displaced rearward. Accordingly, it is not possible to accurately supply the first hydraulic pressure and the second hydraulic pressure.

SUMMARY

The embodiments of the disclosure provide a hydraulic supply structure capable of accurately supplying a first hydraulic pressure and a second hydraulic pressure.

An embodiment of the disclosure provides a hydraulic supply structure (for example, a hydraulic supply structure 1 in the embodiment, the same below) which supplies a first hydraulic pressure and a second hydraulic pressure that occasionally supplied from a rear side of the hydraulic supply structure at different timings to a front side of the hydraulic supply structure via a first hydraulic supply passage (for example, a first hydraulic supply passage 3 in the embodiment, the same below) and a second hydraulic supply passage (for example, a second hydraulic supply passage 4 in the embodiment, the same below), including:

an inner pipe (for example, an inner pipe 6 in the embodiment, the same below) configured to form a first pipe path (for example, a first pipe path 5 in the embodiment, the same below) which is a part of the first hydraulic supply passage and having a first flange-like portion (for example, a first flange-like portion 12a in the embodiment, the same below) extending radially outward from an outer circumference of a rear side end portion of the inner pipe;

an outer pipe (for example, an outer pipe 8 in the embodiment, the same below) disposed outside the inner pipe so that a rear side end portion of the outer pipe is located in front of the first flange-like portion, configured to form a second pipe path (for example, a second pipe path 7 in the embodiment, the same below) which is a part of the second hydraulic supply passage between the inner pipe and the outer pipe and having a second flange-like portion (for example, a second flange-like portion 12b in the embodiment, the same below) extending radially outward from an outer circumference of a portion away forward from the rear side end portion of the outer pipe;

a casing (for example, a casing 9 in the embodiment, the same below) configured to accommodate the inner pipe and the outer pipe;

an annular inner pipe holding portion (for example, an inner pipe holding portion 10 in the embodiment, the same below) provided adjacent to a front side of the first flange-like portion and which abuts on an outer circumference of the inner pipe and the first flange-like portion and configured to hold the inner pipe in the casing; and an annular outer pipe holding portion (for example, an outer pipe holding portion 11 in the embodiment, the same below) which abuts on an outer circumference of a portion of the outer pipe located on a rear side of the second flange-like portion and configured to hold the outer pipe in the casing, wherein each of the outer pipe holding portion and the inner pipe holding portion is a part of a pipe holding member (for example, a pipe holding member 15 in the embodiment, the same below) configured as an integral member, and an annular inner second hydraulic supply space (for example, an inner second hydraulic supply space 16 in the embodiment, the same below) which is connected to a rear end portion of the second pipe path and forms a part of the second hydraulic supply passage is configured between the pipe holding member and an outer circumferential surface of the inner pipe, and a side surface (for example, a side surface 17 in the embodiment, the same below) of the inner pipe holding portion which is directed rearward forms a part of the first hydraulic supply passage, and a side surface (for example, a side surface 18 in the embodiment, the same below) of the inner pipe holding portion which is directed forward forms an inner surface of the inner second hydraulic supply space located on a rear side, and a side surface (for example, a side surface 19 in the embodiment, the same below) of the outer pipe holding portion which is directed rearward forms an inner surface of the inner second hydraulic supply space located on a front side.

Further, in one or some exemplary embodiments of the disclosure, the outer pipe holding portion may include an annular extending portion (for example, an annular extending portion 20 in the embodiment, the same below) configured to extend forward beyond an outer circumference of the second flange-like portion, and a concave portion (for example, a concave portion 21 in the embodiment, the same below) configured to open forward may be provided in the annular extending portion, and a convex portion (for example, a convex portion 22 in the embodiment, the same below) configured to protrude radially outward of the annular extending portion via a portion of the concave portion located on a rear side may be provided on a portion of the second flange-like portion corresponding to the concave portion, and an annular groove for a circlip may be provided in an outer circumferential surface of the annular extending portion on a front side of the convex portion, and the convex portion may be fastened in the concave portion by the circlip installed in the annular groove.

Further, in one or some exemplary embodiments of the disclosure, the pipe holding member may have a large diameter coupling portion (for example, a large diameter coupling portion 25 in the embodiment, the same below) having an outer diameter larger than that of each of the inner pipe holding portion and the outer pipe holding portion between the inner pipe holding portion and the outer pipe holding portion in forward and rearward directions, and the large diameter coupling portion joins the inner pipe holding portion and the outer pipe holding portion, and an annular outer second hydraulic supply space (for example, an outer second hydraulic supply space 27 in the embodiment, the same below) is configured between the casing and a side surface (for example, a side surface 26 in the embodiment, the same below) of the large diameter coupling portion which is directed rearward of a portion located radially outward of an outer diameter of the inner pipe holding portion, wherein the annular outer second hydraulic supply space forms a part of the second hydraulic supply passage, and a communication oil passage (for example, a communication oil passage 28 in the embodiment, the same below) configured to allow the outer second hydraulic supply space to communicate with the inner second hydraulic supply space may be provided in the pipe holding member.

Further, in one or some exemplary embodiments of the disclosure, annular seal members (for example, O-rings 29 and 30 in the embodiment, the same below) are configured to seal between an outer circumference of the large diameter coupling portion and a portion of the casing corresponding thereto, and to seal between an outer circumference of the inner pipe holding portion and a portion of the casing corresponding thereto respectively, and the communication oil passage may be disposed between the large diameter coupling portion and the inner pipe holding portion in a manner obliquely in forward and rearward directions while avoiding interference with the annular seal members.

DESCRIPTION OF THE EMBODIMENTS

Here, the conventional outer pipe holding portion and inner pipe holding portion are configured as separate members separate from each other. In this case, when the first hydraulic pressure is supplied to the first hydraulic supply passage and the second hydraulic pressure is not supplied to the second hydraulic supply passage, the inner pipe holding portion is slightly displaced forward due to a pressure difference in both supply passages. Conversely, when the first hydraulic pressure is not supplied to the first hydraulic supply passage and the second hydraulic pressure is supplied to the second hydraulic supply passage, the inner pipe holding portion is slightly displaced rearward.

As described above, when the inner pipe holding portion is displaced forward and rearward, volumes of the first hydraulic supply passage and the second hydraulic supply passage slightly increase or decrease. Therefore, the first hydraulic pressure and the second hydraulic pressure may not be supplied accurately.

In this respect, according to one of the embodiments of the disclosure, since each of the outer pipe holding portion and the inner pipe holding portion is formed as a part of the pipe holding member which is an integral member, a relative positional relationship between the outer pipe holding portion and the inner pipe holding portion does not change.

Therefore, even when the first hydraulic pressure and the second hydraulic pressure are supplied at different timings, these hydraulic pressures can be supplied more accurately than in the related art.

Further, in the hydraulic supply structure, since the inner pipe holding portion and the outer pipe holding portion can be assembled as one pipe holding member, it is possible to improve convenience at the time of assembling these holding portions as compared with the conventional case in which the inner pipe holding portion and the outer pipe holding portion are separate. Therefore, the number of components is reduced, and thus cost of an apparatus can also be reduced.

Accordingly, by fastening the convex portion in the concave portion by the circlip, the outer pipe can be installed in the outer pipe holding portion to cause the outer pipe not to escape forward from the outer pipe holding portion and also not to rotate in a circumferential direction. Therefore, a configuration for preventing rotation of the outer pipe and also preventing the outer pipe from escaping from the outer pipe holding portion can be easily and compactly provided.

Accordingly, even in the case in which the second hydraulic pressure is supplied, like the case in which the first hydraulic pressure is supplied, a forward force due to the second hydraulic pressure is applied to the pipe holding member via the side surface directed rearward of the large diameter coupling portion. Thus, in any case of the case in which the first hydraulic pressure is supplied and the case in which the second hydraulic pressure is supplied, a forward force is always applied to the pipe holding member.

Therefore, by fixing a front side of the pipe holding member to the casing, it is possible to avoid displacement of the pipe holding member at the time of supplying the first hydraulic pressure and at the time of supplying the second hydraulic pressure and thus to more accurately supply the first hydraulic pressure and the second hydraulic pressure.

Accordingly, it is possible to shorten a dimension of the device in the axial direction while providing the communication oil passage to avoid interference with each annular seal member.

Figure 1:
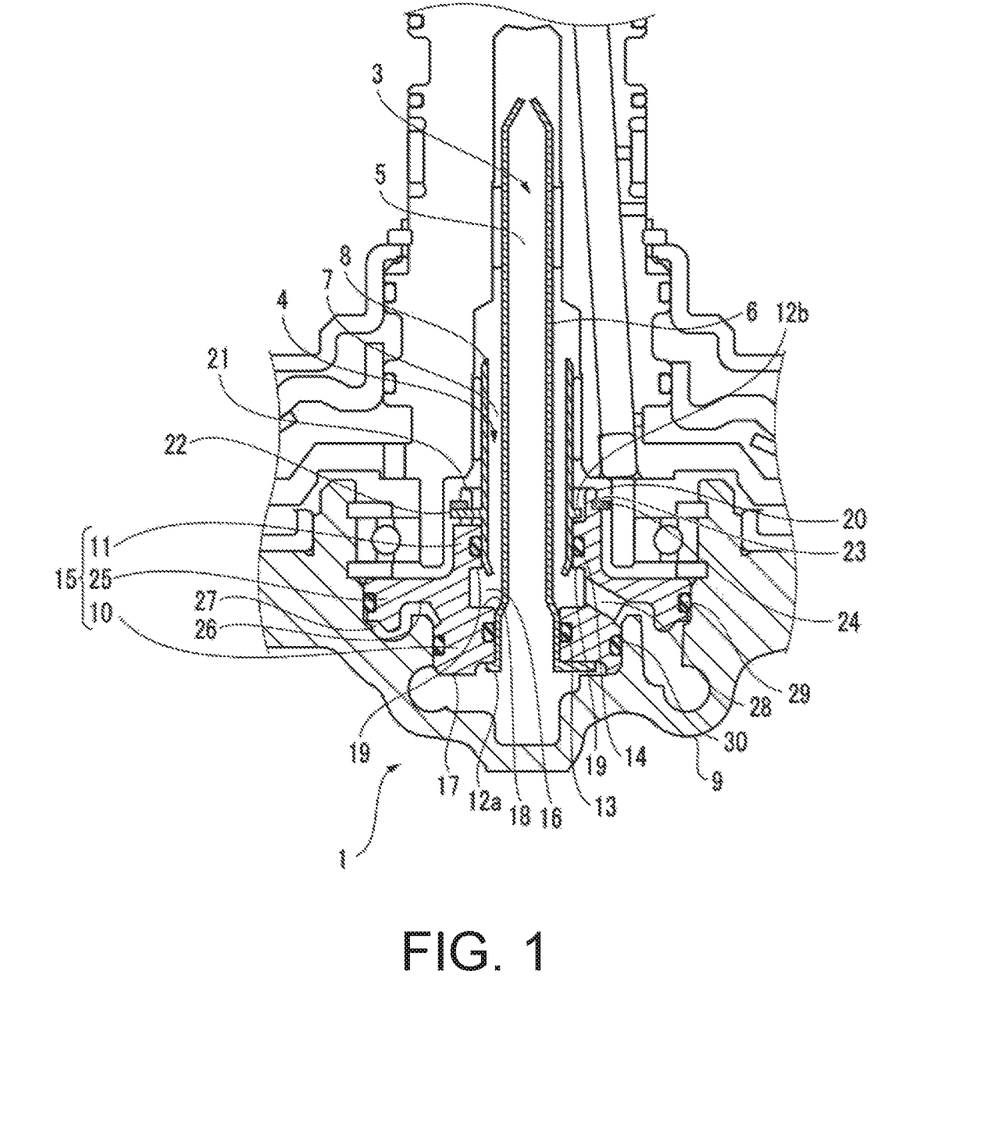
FIG. 1 is a cross-sectional view of a hydraulic supply structure according to one embodiment of the disclosure incorporated in a transmission.

Hereinafter, some embodiments of the disclosure will be described below with reference to the drawings. As illustrated in FIG. 1, a hydraulic supply structure 1 according to an embodiment supplies a first hydraulic pressure and a second hydraulic pressure, which may be supplied to a rear side at different timings, to a front side via a first hydraulic supply passage 3 and a second hydraulic supply passage 4, respectively. Further, in FIG. 1, only main parts are indicated by hatching.

The hydraulic supply structure 1 includes an inner pipe 6 forming a first pipe path 5 which is a part of the first hydraulic supply passage 3, an outer pipe 8 disposed outside the inner pipe 6 and forming a second pipe path 7 which is a part of the second hydraulic supply passage 4 between the outer pipe 8 and the inner pipe 6, a casing 9 for accommodating the inner pipe 6 and the outer pipe 8, an annular inner pipe holding portion 10 for fixing the inner pipe 6 to the casing 9, and an annular outer pipe holding portion 11 for fixing the outer pipe to the casing 9.

The inner pipe 6 has a first flange-like portion 12a extending radially outward from an outer circumference of a rear side end portion thereof. The outer pipe 8 has a second flange-like portion 12b which is disposed outside the inner pipe 6 so that a rear side end portion thereof is located in front of the first flange-like portion 12a and also extends radially outward from an outer circumference of a portion thereof away forward from the rear side end portion.

The inner pipe holding portion 10 is provided close to a front side of the first flange-like portion 12a, is contact with the outer circumference of the inner pipe 6 via an O-ring 13 and is also in contact with the first flange-like portion 12a to fix the inner pipe 6 to the casing 9. The outer pipe holding portion 11 is in contact with an outer circumference of a portion of the outer pipe 8 located behind the second flange-like portion 12b via an O-ring 14 to fix the outer pipe 8 to the casing 9.

Each of the outer pipe holding portion 11 and the inner pipe holding portion 10 is a part of an integral pipe holding member 15. The pipe holding member 15 forms an annular inner second hydraulic supply space 16 connected to a rear end portion of the second pipe path 7 and forming a part of the second hydraulic supply passage 4 between an outer circumferential surface of the inner pipe 6 and the pipe holding member 15.

A side surface 17 of the inner pipe holding portion 10 which is directed rearward forms a part of the first hydraulic supply passage 3. A side surface 18 of the inner pipe holding portion 10 which is directed forward forms an inner surface of the inner second hydraulic supply space 16 on a rear side. A side surface 19 of the outer pipe holding portion 11 which is directed rearward forms an inner surface of the inner second hydraulic supply space 16 on a front side.

Figure 2:
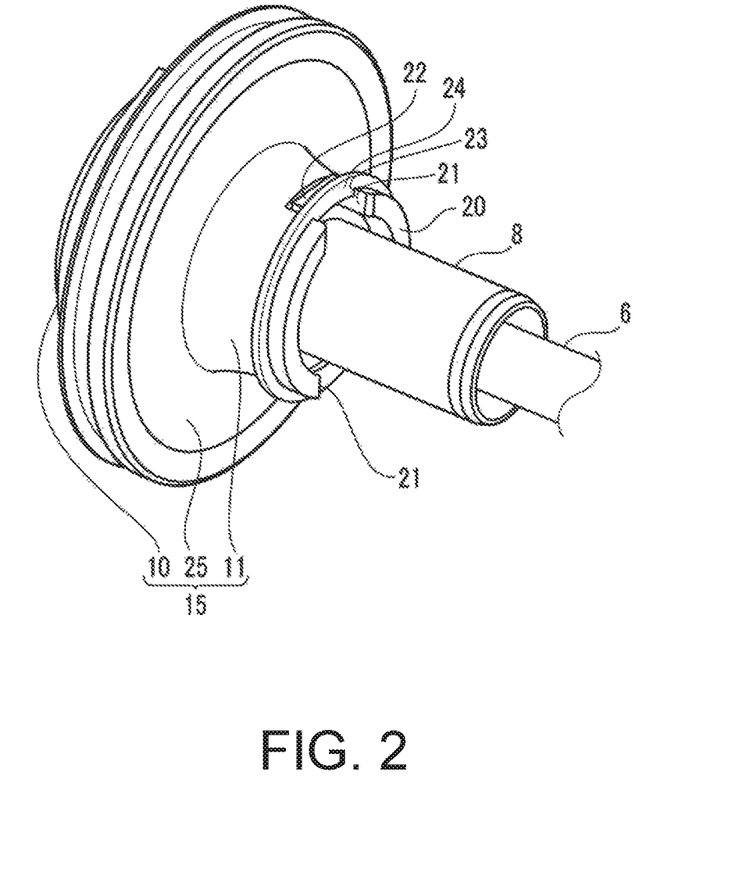
FIG. 2 is a perspective view illustrating a main part of the hydraulic supply structure of FIG. 1.

As illustrated in FIG. 2, the outer pipe holding portion 11 has an annular extending portion 20 which extends forward beyond an outer circumference of the second flange-like portion 12b of the outer pipe 8. In the annular extending portion 20, two concave portions 21 which open forward are provided at positions symmetrical to each other. Two convex portions 22 which protrude outward in a radial direction of the annular extending portion 20 via rear side portions of the concave portions 21 are provided in portions of the second flange-like portion 12b corresponding to the two concave portions 21.

An annular groove 23 for a circlip is provided in an outer circumferential surface of the annular extending portion 20 on a front side of each of the convex portions 22. Each of the convex portions 22 is fixed to each of the concave portions 21 by a circlip 24 installed in the annular groove 23.

Returning to FIG. 1, the pipe holding member 15 has a large diameter coupling portion 25 having an outer diameter larger than that of each of the inner pipe holding portion 10 and the outer pipe holding portion 11 by joining the inner pipe holding portion 10 and the outer pipe holding portion 11 between the inner pipe holding portion 10 and the outer pipe holding portion 11 in forward and rearward directions.

A side surface 26 of the large diameter coupling portion 25 which is directed rearward of a portion located radially outward of the outer diameter of the inner pipe holding portion 10 forms an annular outer second hydraulic supply space 27 forming a part of the second hydraulic supply passage 4 between the side surface 26 and the casing 9. A communication oil passage 28 which allows the outer second hydraulic supply space 27 to communicate with the inner second hydraulic supply space 16 is provided in the pipe holding member 15.

O-rings 29 and 30 as annular seal members for sealing between an outer circumference of the large diameter coupling portion 25 and a corresponding portion of the casing 9 and between an outer circumference of the inner pipe holding portion 10 and a corresponding portion of the casing 9 are provided between the outer circumference of the large diameter coupling portion 25 and the corresponding portion of the casing 9 and between the outer circumference of the inner pipe holding portion 10 and the corresponding portion of the casing 9. The communication oil passage 28 is provided by inclining a portion of the pipe holding member 15 between the large diameter coupling portion 25 and the inner pipe holding portion 10 obliquely in the forward and rearward directions while avoiding interference with the O rings 29 and 30.

Figure 3A:
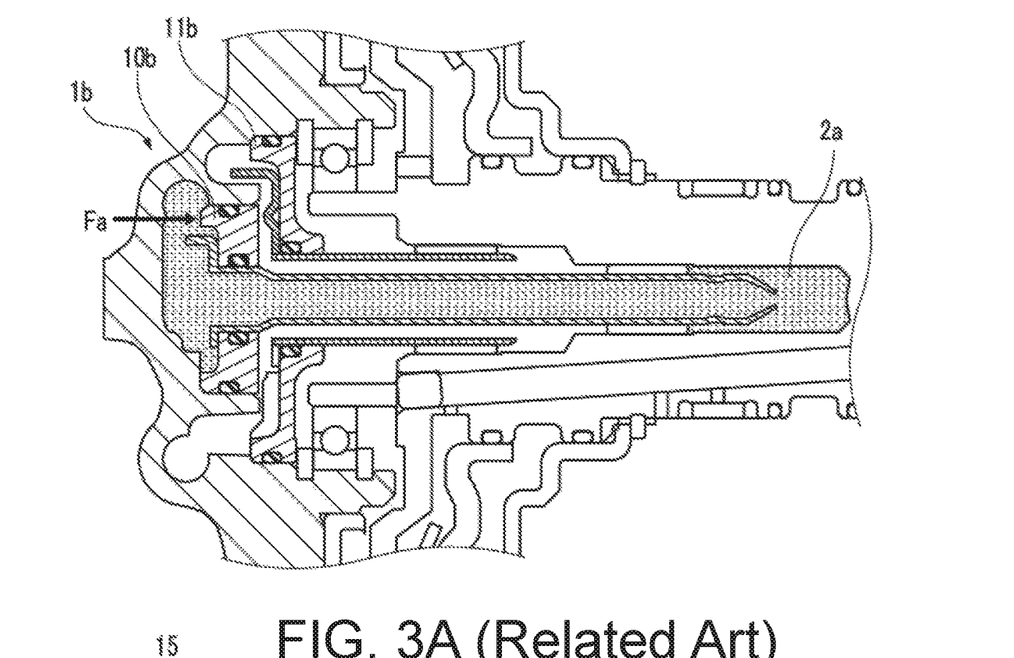
FIG. 3A is a view illustrating a state of a case in which a first hydraulic pressure is supplied to a conventional hydraulic supply structure.
Figure 3B:
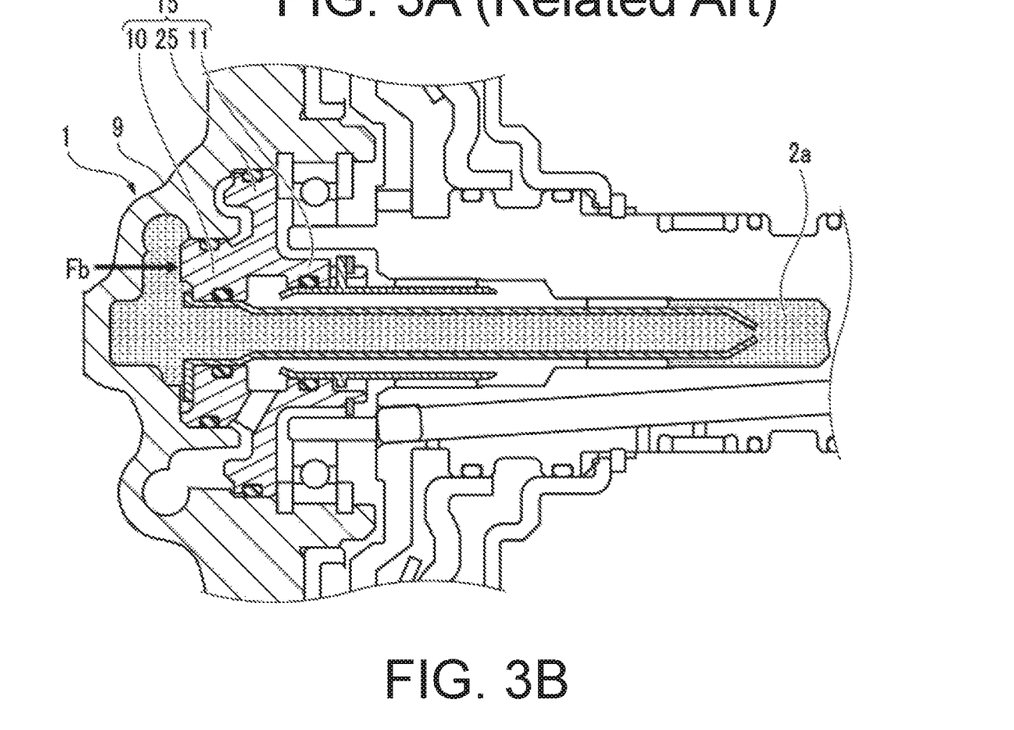
FIG. 3B is a view illustrating a state of a case in which the first hydraulic pressure is supplied to the hydraulic supply structure of FIG. 1 in comparison with FIG. 3A.
Figure 4A:
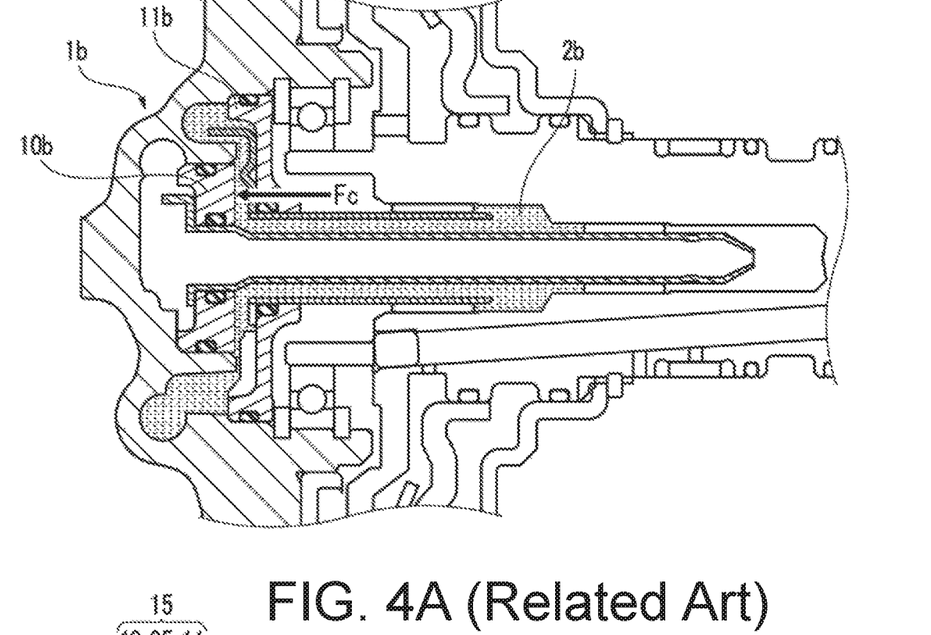
FIG. 4A is a view illustrating a state of a case in which a second hydraulic pressure is supplied to the conventional hydraulic supply structure, and of FIG. 4B is a view illustrating a state of a case in which the second hydraulic pressure is supplied to the hydraulic supply structure of FIG. 1 in comparison with of FIG. 4A.
Figure 4B:
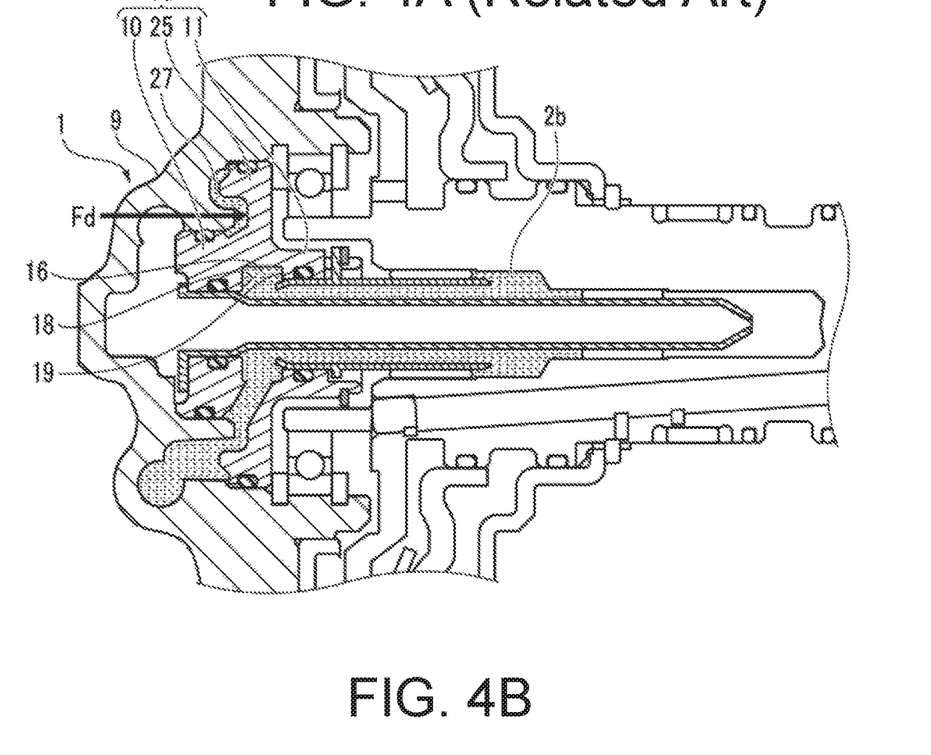
Figure 5A:
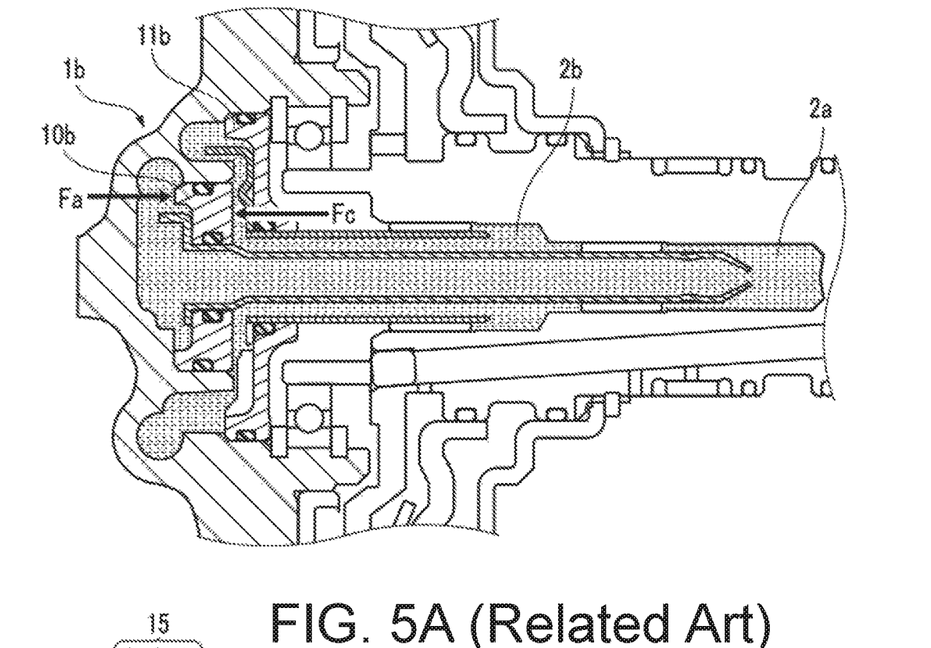
FIG. 5A is a view illustrating a state of a case in which the first hydraulic pressure and the second hydraulic pressure are simultaneously supplied to the conventional hydraulic supply structure.
Figure 5B:
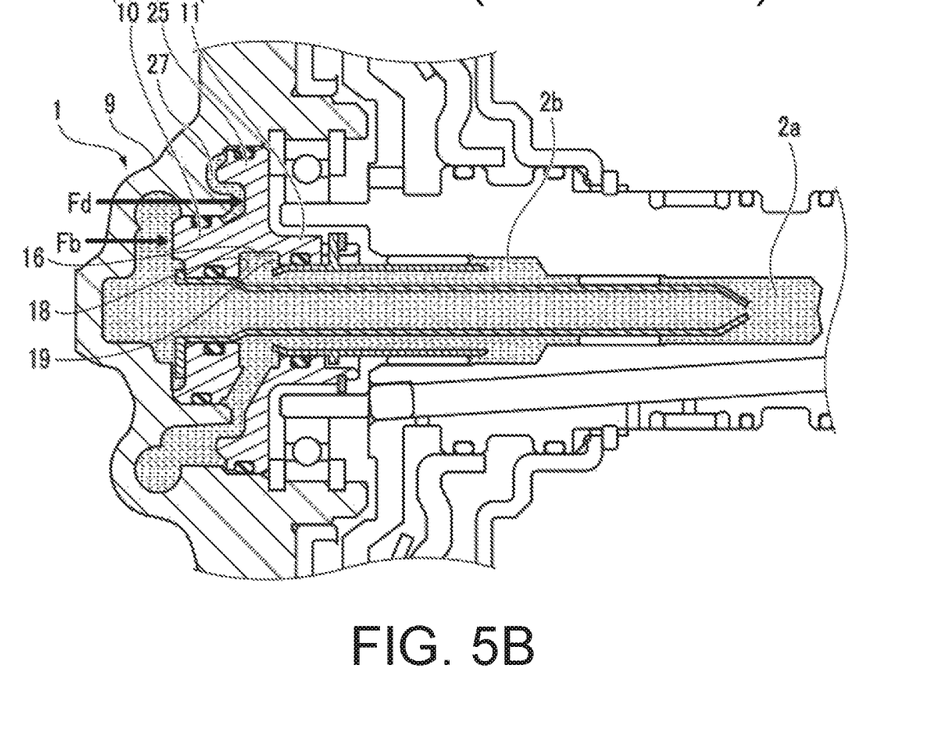
FIG. 5B is a view illustrating a state of a case in which the first hydraulic pressure and the second hydraulic pressure are simultaneously supplied to the hydraulic supply structure of FIG. 1 in comparison with FIG. 5A.

FIGS. 3A, 3B and FIGS. 4A, 4B illustrate a function of the hydraulic supply structure 1 in comparison with in a conventional case. FIG. 3A, FIG. 4A and FIG. 5A illustrate the conventional case, and FIG. 3B, FIG. 4B and FIG. 5B illustrate a case of the hydraulic supply structure 1 of the embodiment. FIG. 3A and FIG. 3B illustrate a case in which only the first hydraulic pressure is supplied, FIG. 4A and FIG. 4B illustrate a case in which only the second hydraulic pressure is supplied, and FIG. 5A and FIG. 5B illustrate a case in which the first hydraulic pressure and the second hydraulic pressure are supplied simultaneously.

As illustrated in FIG. 3A, FIG. 4A and FIG. 5A, in the case of a conventional hydraulic supply structure 1b, an inner pipe holding portion 10b and an outer pipe holding portion 11b are configured as separate members separate from each other. Therefore, when only a hydraulic medium 2a related to the first hydraulic pressure is supplied, a forward force Fa is applied to the inner pipe holding portion 10b by the first hydraulic pressure, as illustrated in FIG. 3A. Accordingly, the inner pipe holding portion 10b is slightly displaced forward.

In the case of the hydraulic supply structure 1 of the embodiment, when only the hydraulic medium 2a related to the first hydraulic pressure is supplied, a forward force Fb is applied to the inner pipe holding portion 10, as illustrated in FIG. 3B, and this force Fb is received by the entire pipe holding member 15. Therefore, the entire pipe holding member 15 is slightly displaced forward.

On the other hand, when only the hydraulic medium 2b related to the second hydraulic pressure is supplied, a force Fc in the rearward direction is applied to the inner pipe holding portion 10b, as illustrated in FIG. 4A. As a result, the inner pipe holding portion 10b is slightly displaced rearward. Therefore, when the first hydraulic pressure is supplied and when the second hydraulic pressure is supplied, the inner pipe holding portion 10b is displaced by a displacement amount obtained by adding a displacement amount due to the force Fc and a displacement amount due to the force Fa in the case of FIG. 3A.

In this regard, in the case of the hydraulic supply structure 1 of the embodiment, the hydraulic medium 2b in the outer second hydraulic supply space 27 applies a forward force Fd to the large diameter coupling portion 25 of the pipe holding member 15, as illustrated in FIG. 4B. Further, the hydraulic medium 2b in the inner second hydraulic pressure space 16 applies a rearward force and a forward force to the side surfaces 18 and 19 of the pipe holding member 15, respectively. Therefore, the forward force is applied to the entire pipe holding member 15.

Further, when there is no the outer second hydraulic supply space 27, the rearward force and the forward force applied to the side surfaces 18 and 19 of the pipe holding member 15 are offset to some extent, and thus a rearward force weakened by that much is applied to the pipe holding member 15.

Further, in the conventional hydraulic supply structure 1b, when the first hydraulic pressure and the second hydraulic pressure are supplied simultaneously, the forward force Fa and the rearward force Fc are simultaneously applied to the inner pipe holding portion 10b, as illustrated in FIG. 5A, and thus the inner pipe holding portion 10b is located at an intermediate position between the case of FIG. 3A and the case of FIG. 4A.

In this connection, in the case of the hydraulic supply structure 1 of the embodiment, the forward forces Fb and Fd are mainly applied, as illustrated in FIG. 5B. That is, a relatively large forward force is applied to the pipe holding member 15.

As described above, in the case of the hydraulic supply structure 1 of the embodiment, since the forward force is applied to the pipe holding member 15 even in any case of FIG. 3B, FIG. 4B and FIG. 5B, displacement of the pipe holding member 15 can be avoided by fixing a front side of the pipe holding member 15 to the casing 9.

Thus, irrespective of there being a case in which only the first hydraulic pressure is supplied, a case in which only the second hydraulic pressure is supplied, or a case in which both the first hydraulic pressure and the second hydraulic pressure are simultaneously supplied, it is possible to supply the hydraulic pressure with an accurate hydraulic pressure value.

Further, even when there is no outer second hydraulic supply space 27, the outer pipe holding portion 11 and the inner pipe holding portion 10 are formed as a part of the pipe holding member 15 which is an integral member, and thus the relative positional relationship between the outer pipe holding portion 11 and the inner pipe holding portion 10 does not change even when only the second hydraulic pressure is supplied. Therefore, even when the first hydraulic pressure and the second hydraulic pressure are supplied at different timings, these hydraulic pressures can be supplied more accurately than in the conventional case.

Further, since the inner pipe holding portion 10 and the outer pipe holding portion 11 can be assembled as one pipe holding member 15 with respect to the hydraulic supply structure 1, assembling of fixing portions thereof can be performed in fewer processes than those in the conventional case in which the inner pipe holding portion 10 and the outer pipe holding portion 11 are separate. Therefore, the number of components is reduced, and thus cost of the apparatus can also be reduced.

Further, by fastening the convex portions 22 of the outer pipe 8 to the concave portions 21 of the outer pipe holding portion 11 using the circlip 24, the outer pipe 8 can be installed in the outer pipe holding portion 11 to cause the outer pipe 8 not to escape forward from the outer pipe holding portion 11 and also not to rotate in a circumferential direction. Therefore, a configuration for preventing rotation of the outer pipe 8 and also preventing the outer pipe 8 from escaping from the outer pipe holding portion 11 can be easily and compactly provided.

Further, since the communication oil passage 28 is provided to be inclined obliquely in the forward and rearward directions while a portion between the large diameter coupling portion 25 and the inner pipe holding portion 10 of the pipe holding member 15 avoids interfering with the O rings 13 and 29, a dimension of the hydraulic supply structure 1 in an axial direction can be shortened.

Further, the disclosure is not limited to the above embodiment. For example, the hydraulic supply structure of the disclosure is not limited to a transmission and may be applied to other devices in which the first hydraulic pressure and the second hydraulic pressure may be supplied at different timings.

Furthermore, in the disclosure, the forward and rearward directions define directions, for example, not related to a front and a rear of a vehicle. Therefore, the forward direction in the disclosure may be to the rear side of the vehicle, or to the left side or the right side thereof. In other words, it can also be said that the forward direction is to one side and the rearward direction is to the other side.

What is claimed is:

1. A hydraulic supply structure which supplies a first hydraulic pressure and a second hydraulic pressure that occasionally supplied from a rear side of the hydraulic supply structure at different timings to a front side of the hydraulic supply structure via a first hydraulic supply passage and a second hydraulic supply passage, comprising:
    an inner pipe configured to form a first pipe path which is a part of the first hydraulic supply passage and having a first flange-like portion extending radially outward from an outer circumference of a rear side end portion of the inner pipe;
    an outer pipe disposed outside the inner pipe so that a rear side end portion of the outer pipe is located in front of the first flange-like portion, configured to form a second pipe path which is a part of the second hydraulic supply passage between the inner pipe and the outer pipe and having a second flange-like portion extending radially outward from an outer circumference of a portion away forward from the rear side end portion of the outer pipe;
    a casing configured to accommodate the inner pipe and the outer pipe;
    an annular inner pipe holding portion provided adjacent to a front side of the first flange-like portion and which abuts on an outer circumference of the inner pipe and the first flange-like portion and configured to hold the inner pipe in the casing; and
    an annular outer pipe holding portion which abuts on an outer circumference of a portion of the outer pipe located on a rear side of the second flange-like portion and configured to hold the outer pipe in the casing,
    wherein each of the outer pipe holding portion and the inner pipe holding portion is a part of a pipe holding member configured as an integral member, and
    an annular inner second hydraulic supply space which is connected to a rear end portion of the second pipe path and forms a part of the second hydraulic supply passage is configured between the pipe holding member and an outer circumferential surface of the inner pipe, and
    a side surface of the inner pipe holding portion which is directed rearward forms a part of the first hydraulic supply passage, and
    a side surface of the inner pipe holding portion which is directed forward forms an inner surface of the inner second hydraulic supply space located on a rear side, and
    a side surface of the outer pipe holding portion which is directed rearward forms an inner surface of the inner second hydraulic supply space located on a front side.

2. The hydraulic supply structure according to claim 1, wherein the outer pipe holding portion has an annular extending portion configured to extend forward beyond an outer circumference of the second flange-like portion,
    a concave portion configured to open forward is provided in the annular extending portion,
    a convex portion configured to protrude radially outward of the annular extending portion via a portion of the concave portion located on a rear side is provided on a portion of the second flange-like portion corresponding to the concave portion,
    an annular groove for a circlip is provided in an outer circumferential surface of the annular extending portion on a front side of the convex portion, and the convex portion is fastened in the concave portion by the circlip installed in the annular groove.

3. The hydraulic supply structure according to claim 1, wherein the pipe holding member has a large diameter coupling portion having an outer diameter larger than that of each of the inner pipe holding portion and the outer pipe holding portion between the inner pipe holding portion and the outer pipe holding portion in forward and rearward directions, and the large diameter coupling portion joins the inner pipe holding portion and the outer pipe holding portion, and
    an annular outer second hydraulic supply space is configured between the casing and a side surface of the large diameter coupling portion which is directed rearward of a portion located radially outward of an outer diameter of the inner pipe holding portion, wherein the annular outer second hydraulic supply space forms a part of the second hydraulic supply passage, and
    a communication oil passage configured to allow the outer second hydraulic supply space to communicate with the inner second hydraulic supply space is provided in the pipe holding member.

4. The hydraulic supply structure according to claim 2, wherein the pipe holding member has a large diameter coupling portion having an outer diameter larger than that of each of the inner pipe holding portion and the outer pipe holding portion between the inner pipe holding portion and the outer pipe holding portion in forward and rearward directions, and the large diameter coupling portion joins the inner pipe holding portion and the outer pipe holding portion, and
    an annular outer second hydraulic supply space is configured between the casing and a side surface of the large diameter coupling portion which is directed rearward of a portion located radially outward of an outer diameter of the inner pipe holding portion, wherein the annular outer second hydraulic supply space forms a part of the second hydraulic supply passage, and
    a communication oil passage configured to allow the outer second hydraulic supply space to communicate with the inner second hydraulic supply space is provided in the pipe holding member.

5. The hydraulic supply structure according to claim 1, wherein annular seal members are configured to seal between an outer circumference of the large diameter coupling portion and a portion of the casing corresponding thereto, and to seal between an outer circumference of the inner pipe holding portion and a portion of the casing corresponding thereto respectively, and
    the communication oil passage is disposed between the large diameter coupling portion and the inner pipe holding portion in a manner obliquely in forward and rearward directions while avoiding interference with the annular seal members.

6. The hydraulic supply structure according to claim 2, wherein annular seal members are configured to seal between an outer circumference of the large diameter coupling portion and a portion of the casing corresponding thereto, and to seal between an outer circumference of the inner pipe holding portion and a portion of the casing corresponding thereto respectively, and
    the communication oil passage is disposed between the large diameter coupling portion and the inner pipe holding portion in a manner obliquely in forward and rearward directions while avoiding interference with the annular seal members.

7. The hydraulic supply structure according to claim 3, wherein annular seal members are configured to seal between an outer circumference of the large diameter coupling portion and a portion of the casing corresponding thereto, and to seal between an outer circumference of the inner pipe holding portion and a portion of the casing corresponding thereto respectively, and the communication oil passage is disposed between the large diameter coupling portion and the inner pipe holding portion in a manner obliquely in forward and rearward directions while avoiding interference with the annular seal members.

* * * * *